(12) United States Patent
King

(10) Patent No.: US 8,271,383 B2
(45) Date of Patent: Sep. 18, 2012

(54) SERVICE SOFT-DISCONNECT RECONNECTION

(75) Inventor: John Kelly King, Asheville, NC (US)

(73) Assignee: Cox Communications, Inc., Atlanta, GA (US)

( * ) Notice: Subject to any disclaimer, the term of this patent is extended or adjusted under 35 U.S.C. 154(b) by 430 days.

(21) Appl. No.: 11/728,641

(22) Filed: Mar. 27, 2007

(65) Prior Publication Data

US 2008/0243686 A1 Oct. 2, 2008

(51) Int. Cl.
*G06Q 40/00* (2012.01)
(52) U.S. Cl. .......................................... 705/40
(58) Field of Classification Search ................ 705/40
See application file for complete search history.

(56) References Cited

U.S. PATENT DOCUMENTS

| | | | |
|---|---|---|---|
| 6,292,567 B1 * | 9/2001 | Marland | 380/208 |
| 6,445,398 B1 * | 9/2002 | Gerba et al. | 715/721 |
| 7,398,541 B2 * | 7/2008 | Bennington et al. | 725/40 |
| 2003/0208444 A1 * | 11/2003 | Sauer | 705/40 |
| 2006/0161499 A1 * | 7/2006 | Rich et al. | 705/39 |
| 2007/0027746 A1 * | 2/2007 | Grabowich | 705/10 |
| 2007/0194881 A1 * | 8/2007 | Schwarz et al. | 340/5.31 |

OTHER PUBLICATIONS

Moible Phone News; "Views on cellular's future from industry Insiders"; v9, n3, p. 1(4); Feb. 14, 1991; ISSN: 0737-5077.*
Fair Disclosure Wire; "Q2 2006 Hanaro Telecom Earning Conference Call—Final"; Aug. 10, 2006; Journal Code: FDCW.*
Network World; "Movies go digital"; p. 32; May 31, 2004; ISSN: 0887-7661.*

* cited by examiner

*Primary Examiner* — Lalita M Hamilton
*Assistant Examiner* — Edward Chang
(74) *Attorney, Agent, or Firm* — Merchant & Gould

(57) ABSTRACT

A service soft disconnection may be provided. First, a first user interface screen may be provided: i) in response to determining that a payment has not been received for a service after a date for which an account holder responsible for the service has been sent a disconnection notice; and ii) in response to receiving a user initiated request for the service. Next, identification data may be received in response to the provided first user interface screen. Then the identification data may be determined to be valid. In response to determining that the identification data is valid, a second user interface screen may be provided. Payment data may then be received in response to the provided second user interface screen. Consequently, the payment data may be determined to be valid and the service may be reinstated in response to determining that the payment data is valid.

15 Claims, 4 Drawing Sheets

SERVICE SOFT-DISCONNECT RECONNECTION

BACKGROUND

Cable television is a system of providing television to consumers via radio frequency signals. These signals are transmitted to televisions (TVs) through fixed optical fibers or coaxial cables as opposed to an over-the-air method used in traditional television broadcasting (via radio waves) in which a television antenna is used. Frequency modulation (FM) radio programming, high-speed Internet, telephony, and similar non-television services may also be provided.

The abbreviation "CATV" is often used to mean "Cable TV". It originally stood for "community antenna television," from cable television's origins. For example, in areas where over-the-air reception was limited by mountainous terrain, large "community antennas" were constructed, and cable was run from them to individual homes. Conventional CATV involves distributing a number of television channels collected at a central location (called a head-end) to subscribers (e.g. customers) within a community by a branched network of optical fibers and/or coaxial cables and broadband amplifiers. Since the early 1990s, the most common architecture is the hybrid fiber-coaxial network. As in the case of radio broadcasting, using different frequencies allows many channels to be distributed through the same cable without separate wires for each channel. A set-top box may select one channel from this cable.

SUMMARY

Consistent with embodiments of the present invention, systems and methods are disclosed for providing a service soft disconnection. First, a first user interface screen may be provided: i) in response to determining that a payment has not been received for a service after a date for which an account holder responsible for the service has been sent a disconnection notice; and ii) in response to receiving a user initiated request for the service. Next, identification data may be received in response to the provided first user interface screen. Then the identification data may be determined to be valid. In response to determining that the identification data is valid, a second user interface screen may be provided. Payment data may then be received in response to the provided second user interface screen. Consequently, the payment data may be determined to be valid and the service may be reinstated in response to determining that the payment data is valid.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
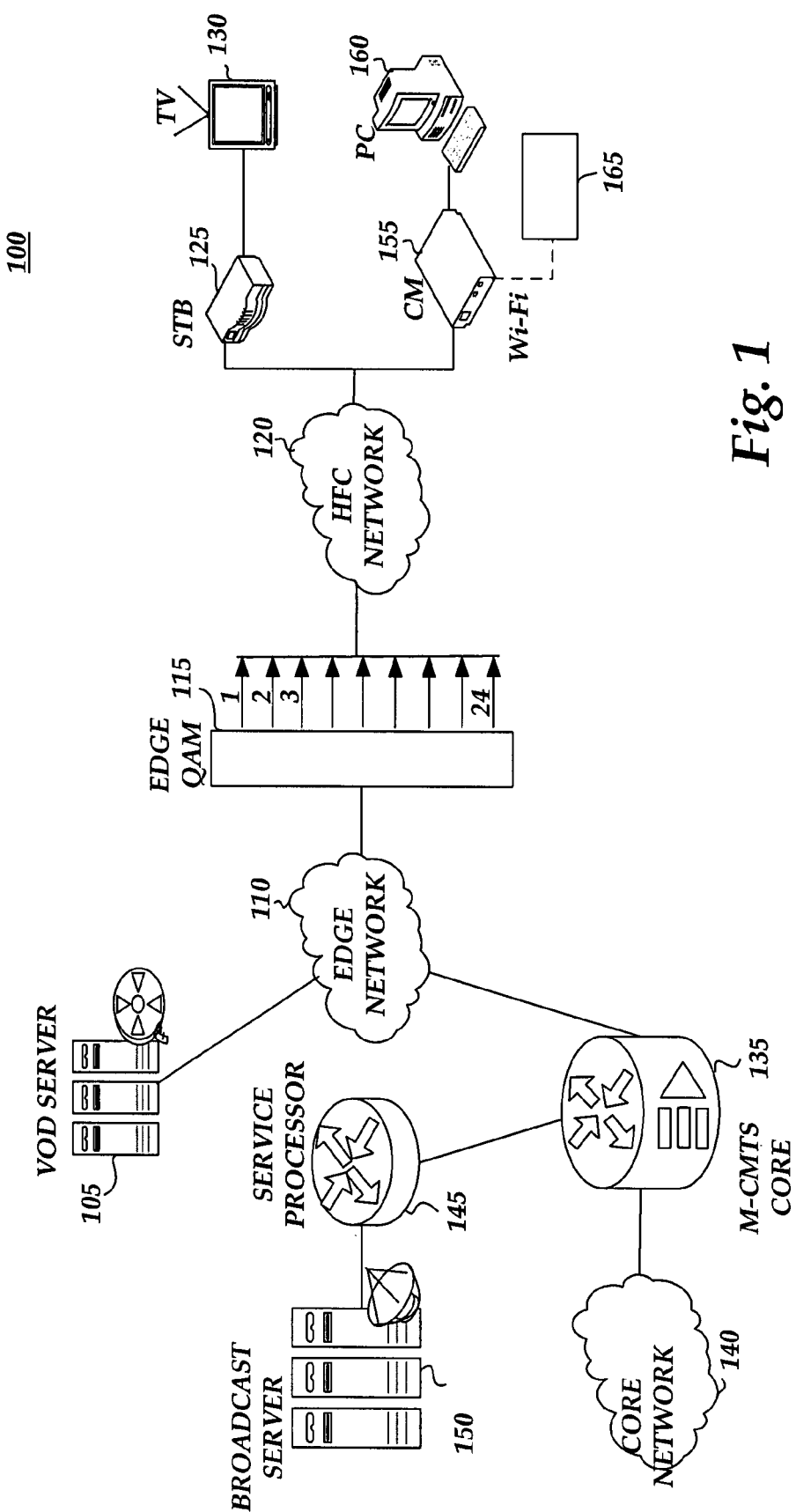
FIG. 1 is a block diagram of an operating environment including a service processor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention may provide a service soft disconnection. One problem system operators have is a customer's failure to pay their bill. For example, when a system operator does not receive a payment for a service after a certain time (e.g. after a grace period), then the system operator may start disconnecting the service. Disconnection may happen in phases. A first phase may comprise the service provider turning the service off from a central office. The first phase may not require sending a service person to the service location to do a physical service disconnection. The first phase may be referred to as a "soft" disconnection. Upon discovering that their service has been disconnected, the customer may call the service provider. To receive such calls, the service provider may maintain a call center staffed with customer service representatives. A customer service representative (CSR) may take the call from the customer who's service was soft disconnected. Upon receiving adequate payment, the CSR may initiate the service being reinstated. If the customer does not pay the bill in a reasonable time period, the service provider may initiate a second phase and send a service technician to the customer's location to physically disconnect the service. This physical disconnection may be referred to as a "hard disconnect."

To avoid the aforementioned telephone calls to the CSRs, which may represent a significant cost for the service provider, the service provider may implement a process. Consistent with embodiments of the invention, the process may be provided over the service provider's system (e.g. a cable television system) that may cause screens to "pop-up" on the customer's television and handle the bill payment flow rather than the CSR as described above. For example, the customer may turn on the customer's television. Instead of content corresponding to the customer's last tuned channel appearing on the television, a user interface screen may appear. The user interface screen may say "please log in for an important message from the service provider." The customer may then submit authentication information (e.g. the last four digits of the customer's social security number, an account personal identification number, or any number that may have been set in advance with the service provider). Once the process authenticates the entered authentication information, the process may present another user interface screen that explains that the problem is that a bill has not been paid. The user interface screen may also explain how the customer may pay the bill now through the television in order to have the service restored. Through the user interface screen, the customer may choose a payment option and pay, for example, by credit card, debit card, or check. Once the process confirms that the payment information is valid, the process may restore service to the customer.

Consistent with embodiments of the invention, "soft disconnect" status may not be the same as "disconnect" status (e.g hard disconnect.) For example, with soft disconnection, the customer may still be officially a customer, but all services that may be disabled remotely may be disabled on service provided-supplied customer premise equipment. For example, if the customer's account goes into the soft disconnect state, the customer may not be able to watch any digital channel or surf the internet, but may be able to watch an analog TV channel. This may be because disabling analog TV service in some markets may require a technician to drive out to the customer's neighborhood and install a "trap" on the service connection.

Embodiments consistent with the invention may comprise a system for providing a service soft disconnection. The system may comprise a memory storage and a processing unit coupled to the memory storage. The processing unit may be operative to provide a first user interface screen. Furthermore, the processing unit may be operative to receive identification data in response to the provided first user interface screen and to determine that the identification data is valid. In addition, the processing unit may be operative to provide, in response to determining that the identification data is valid, a second user interface screen and to receive payment data in response to the provided second user interface screen. Moreover, the processing unit may be operative to determine that the payment data is valid and to reinstate the service in response to determining that the payment data is valid.

Consistent with embodiments of the present invention, the aforementioned memory, processing unit, and other components may be implemented in a content delivery system, such as an exemplary content delivery system 100 of FIG. 1. Any suitable combination of hardware, software, and/or firmware may be used to implement the memory, processing unit, or other components. By way of example, the memory, processing unit, or other components may be implemented with any of a video on demand (VOD) server 105, a set top box (STB) 125, a service processor 145, a broadcast server 150, or a cable modem (CM) 155 in combination with system 100. The aforementioned system and processors are exemplary and other systems and processors may comprise the aforementioned memory, processing unit, or other components, consistent with embodiments of the present invention.

By way of a non-limiting example, FIG. 1 illustrates system 100 in which embodiments of the invention may be implemented. As illustrated in FIG. 1, system 100 may include VOD server 105, an edge network 110, an edge quadrature amplitude modulation (QAM) device 115, a hybrid fiber-coax (HFC) network 120, STB 125, a television (TV) 130, a modular cable modem termination system (M-CMTS) core 135, a core network 140, service processor 145, broadcast server 150, CM 155, a personal computer (PC) 160, and a portable device 165 using wireless fidelity (Wi-Fi), for example. System 100, for example, may generate moving pictures experts group (MPEG) packets over internet protocol (IP) datagrams that can then be received by edge QAM 115.

VOD server 105 may take MPEG compressed video off of a hard disk, format it into MPEG-TS packets inside a user datagram protocol (UDP) packet, and send it into edge network 110. The UDP packets may be received by edge QAM 115, where IP encapsulation may be removed. The MPEG packets may then be forwarded down one QAM channel onto HFC network 120.

HFC network 120 may comprise a communications network (e.g. a cable TV network) that uses a combination of optical fibers and coaxial cable. The fiber in HFC network 120 may provide a high-speed backbone. Coax may be used in HFC network 120 to connect end users to the backbone. Such networks may use, for example, matching data over cable service interface specification (DOCSIS) cable modems at a head end and at a customer premises. Such a configuration may provide bidirectional paths and Internet access.

The MPEG packets may be received, for example, by STB 125 where the video may be removed, decompressed, and sent to TV 130, for example. STB 125 may include all the functionality provided by a cable modem such as CM 155, for example.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115 using DOCSIS bonding.

Figure 2:
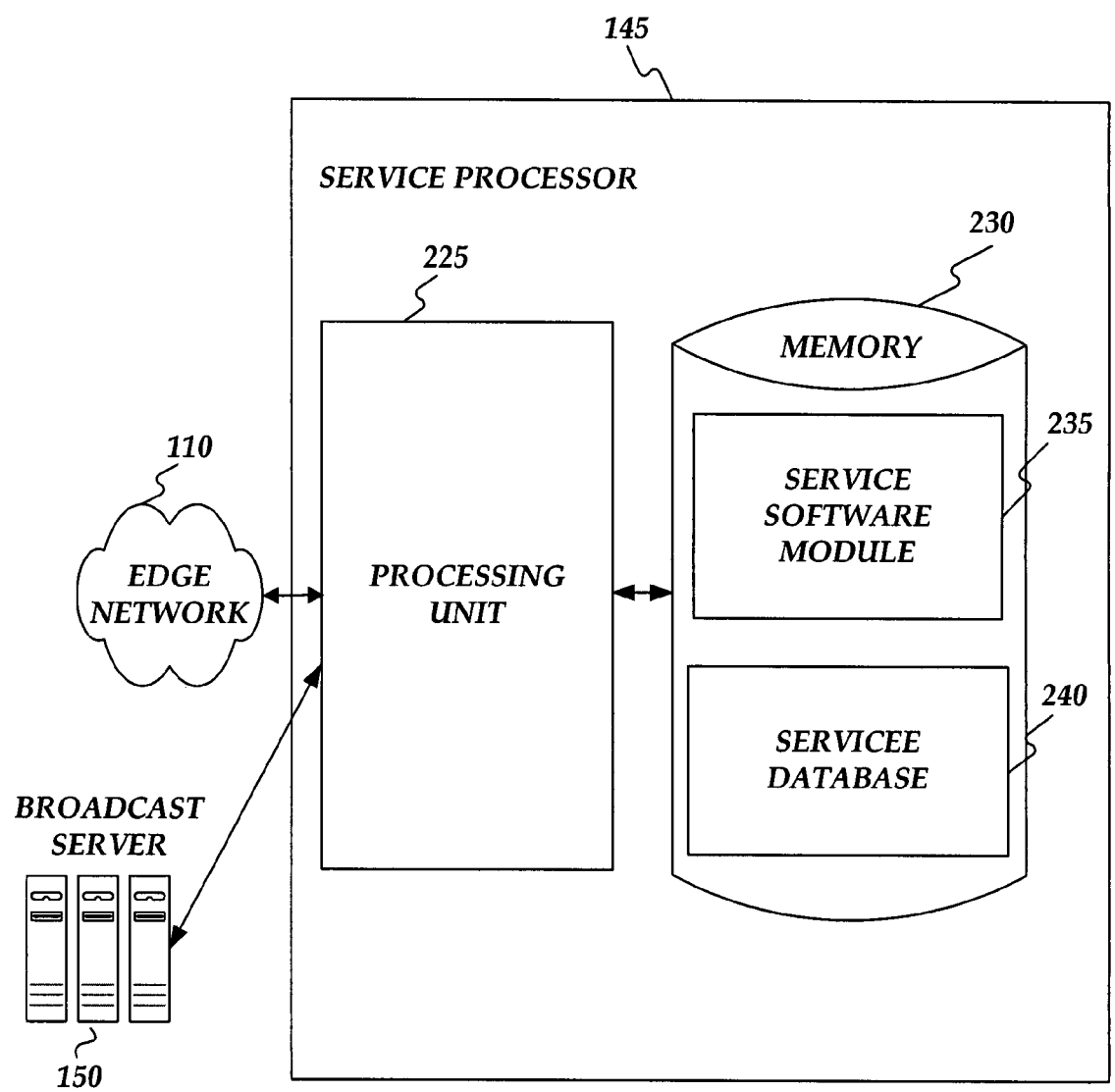
FIG. 2 is a block diagram of the service processor.

FIG. 2 shows service processor 145 of FIG. 1 in more detail. As shown in FIG. 2, service processor 145 may include a processing unit 225 and a memory 230. Memory 230 may include a service software module 235 and a service database 240. While executing on processing unit 225, service software module 235 may perform processes for providing a service soft disconnection, for example, one or more of the stages of method 300 described below with respect to FIG. 3. Furthermore, any combination of software module 235 and database 240 may be executed on or reside in any one or more of the elements as shown in FIG. 1.

Service processor 145 ("the processor") included in system 100 may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. The aforementioned systems and devices are exemplary and the processor may comprise other systems or devices.

Figure 3:
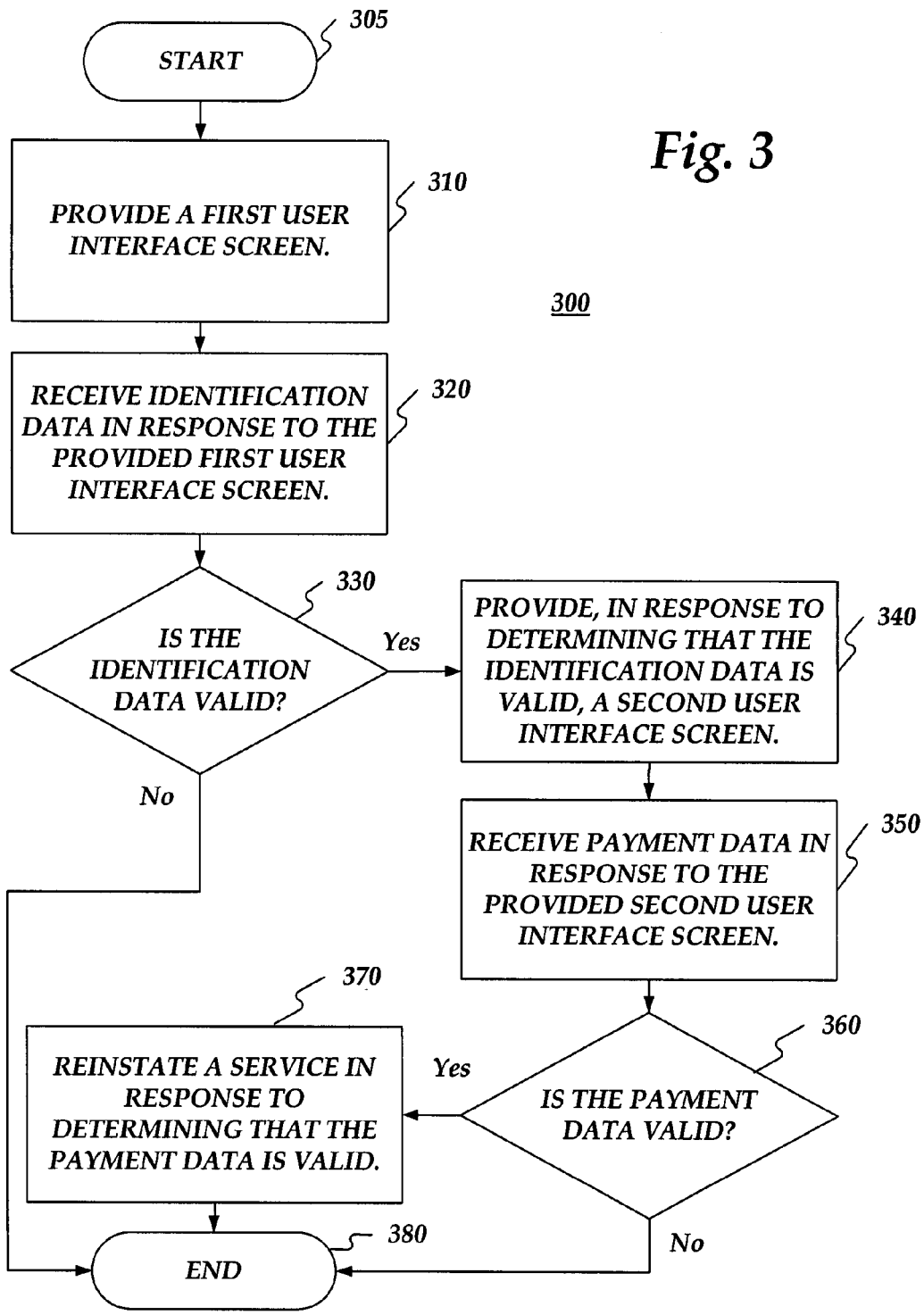
FIG. 3 is a flow chart of a method for providing a soft disconnection for a service.

FIG. 3 is a flow chart setting forth the general stages involved in a method 300 consistent with embodiments of the invention for providing a service soft disconnection. Method 300 may be implemented using a service processor 145 as described in more detail above with respect to FIG. 2. Method 300 may be implemented, but not limited to, using any server, processor, or other element shown in FIG. 1. Ways to implement the stages of method 300 will be described in greater detail below.

Figure 4:
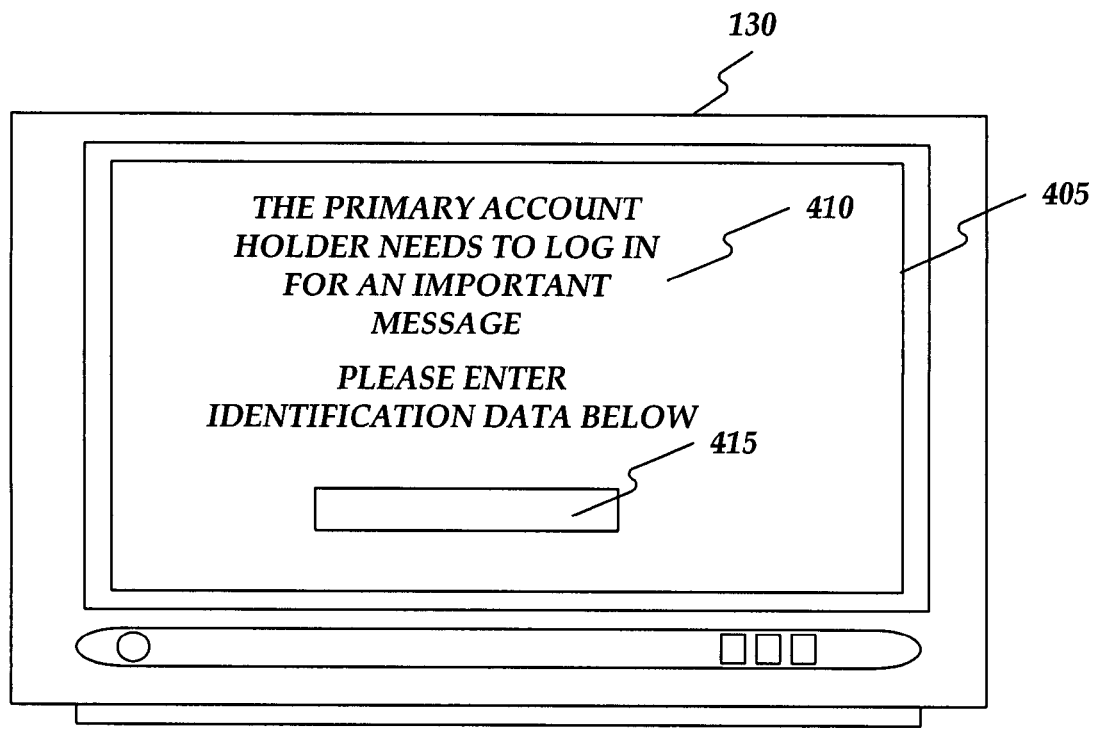
FIG. 4 shows a first user interface screen.

Method 300 may begin at starting block 305 and proceed to stage 310 where service processor 145 may provide a first user interface screen 405 as shown in FIG. 4 to, for example, TV 130 over system 100. For example, a system operator operating system 100 may provide a service over system 100 to TV 130 to a user. The service may comprise, but is not limited to, analog cable television service, digital cable television service, pay-per-view service, internet service, video-on-demand service, telephone service, or broadcast video service. The aforementioned are examples and the service may comprise any type service.

When the system operator does not receive a payment for the service to TV 130 after a certain time period (e.g. after a billing grace period), then the system operator may start disconnecting the service to TV 130. The disconnection may happen in phases. The first phase may comprise the service provider turning the service off from a central office. The first phase may not require sending a service person to the service location to do a physical service disconnection. If the customer receiving service at TV 130 does not pay the bill in a reasonable time period, however, the service provider may initiate a second phase and send a service technician to the customer's location to physically disconnect the service. This physical disconnection may be referred to as a "hard disconnect."

Before the second phase, service processor 145 may cause, over system 100, screens to appear on TV 130 to handle the bill payment flow. Consistent with embodiments of the invention, first user interface screen 405 may be provided over the same system the service is provided (e.g. system 100) and to the same device (e.g. TV 130) that the service is provided to. For example, the user may turn on TV 130. Instead of content corresponding to, for example, the last tuned channel appearing on TV 130, first user interface screen 405 may appear. First user interface screen 405 may appear, for example, when the system operator does not receive payment for the service to TV 130 after a certain time period (e.g. after a billing grace period.) First user interface screen 405 may include a first message 410 configured to encourage the user to log in to learn why the service has been disconnected.

From stage 310, where service processor 145 provides first user interface screen 405; method 300 may advance to stage 320 where service processor 145 may receive identification data over system 100 in response to the provided first user interface screen 405. For example, the user may submit authentication information. The identification information may comprise, but is not limited to, the last four digits of the customer's social security number, an account personal identification number, or any identifier that may have been set up in advance with the service provider. The customer may comprise the user or any subject who is responsible for paying for the service to TV 130. The user may enter the identification information into first data entry field 415.

Once service processor 145 receives the identification data in response to the provided first user interface screen 405 in stage 320, method 300 may continue to decision block 330 where service processor 145 may determine if the identification data is valid. For example, service database 240 may contain pre-established identification data that has been pre-validated. Service processor 145 may compare the received identification data with the pre-established identification from data service database 240. If the comparison shows a match, then service processor 145 may determine that the identification data is valid. If the comparison does not show a match, then service processor 145 may determine that the identification data is invalid.

Figure 5:
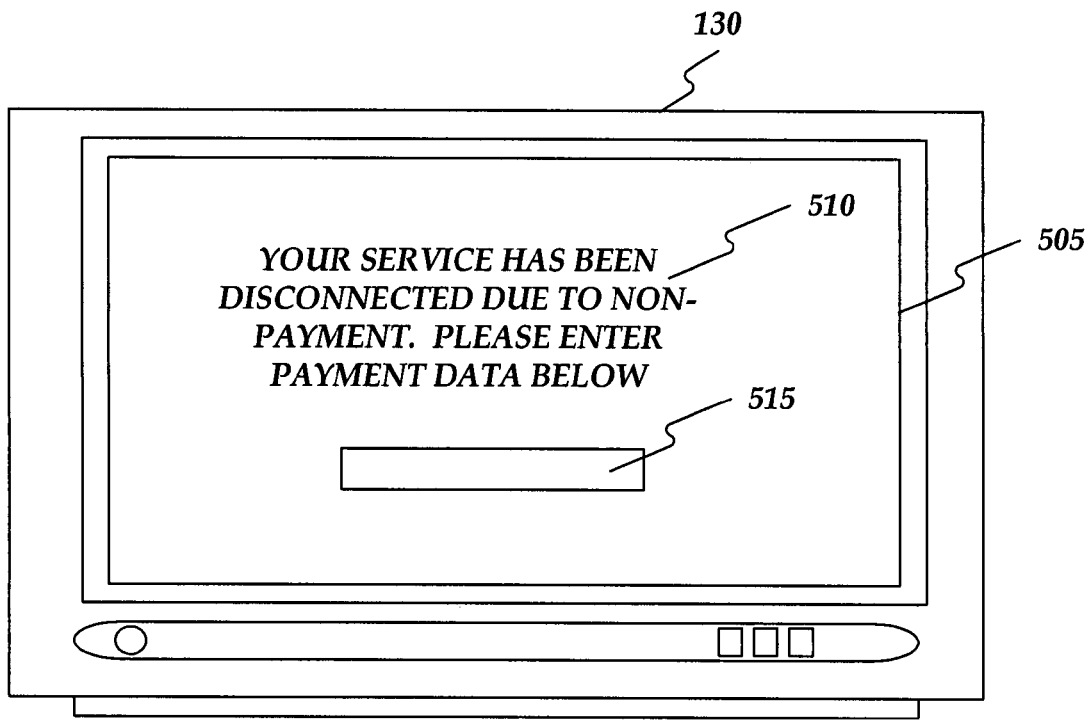
FIG. 5 shows a second user interface screen.

If service processor 145 determines that the identification data is valid at decision block 330, method 300 may proceed to stage 340 where service processor 145 may provide, in response to determining that the identification data is valid, a second user interface screen 505 as shown in FIG. 5. For example, service processor 145 may present second user interface screen 505 that explains that the problem is that a bill has not been paid. Second user interface screen 505 may include a second message 510 configured to explain why normal service is not being provided to TV 130. Second user interface screen 505 may also explain how the user can pay the bill now through TV 130 in order to have the service restored. Consistent with embodiments of the invention, second user interface screen 505 may be provided over the same system the service is provided (e.g. system 100) and to the same device (e.g. TV 130) that the service is provided to.

Once service processor 145 provides second user interface screen 505 in stage 340, method 300 may continue to stage 350 where service processor 145 may receive payment data in response to the provided second user interface screen 505. For example, through second user interface screen 505, the user may choose a payment option and pay, for example, by credit card, debit card, or checking account. The aforementioned are examples and the user may pay in other ways. The user may enter the payment data into second data entry field 515.

After service processor 145 receives the payment data in stage 350, method 300 may continue to decision block 360 where service processor 145 may determine if the payment data is valid. For example, service processor 145 may have the ability to communicate with payment service processors associated with banks, credit card providers, or other financial institutions. Service processor 145 may communicate the payment data to at least one of these payment service processors to determine if the payment data is valid. If any of the payment service processors indicates that the payment data is valid, then service processor 145 may determine that the payment data is valid. If any of the payment service processors indicates that the payment data is not valid, then service processor 145 may determine that the payment data is invalid.

If service processor 145 determines that the payment data is valid at decision block 360, method 300 may proceed to stage 370 where service processor 145 may reinstate the service in response to determining that the payment data is valid. For example, service processor 145 may cause system 100 to reinstate service to TV 130 over system 100. Consistent with embodiments of the invention, the speed at which the service is reinstate after payment is received and validated may be very quick. For example, the service may be reinstate within five seconds of payment validation. Once service processor 145 reinstates the service in stage 370, or from a "no" decision at decision block 330 or from a "no" decision at decision block 360, method 300 may then end at stage 380.

An embodiment consistent with the invention may comprise a system for providing a soft disconnection. The system may comprise a memory storage and a processing unit coupled to the memory storage. The processing unit may be operative to provide a first user interface screen. The processing unit being operative to provide the first user interface screen may comprise the processing unit being operative to provide the first user interface screen in response to determining that a payment has not been received for a service after a date for which an account holder responsible for the service has been sent a disconnection notice and in response to receiving a user initiated request for the service. The processing unit may be further operative to receive identification data in response to the provided first user interface screen and to determine that the identification data is valid. In addition, the processing unit may be operative to provide, in response to determining that the identification data is valid, a second user interface screen and to receive payment data in response to the provided second user interface screen. Moreover, the processing unit may be operative to determine that the payment data is valid and to reinstate the service in response to determining that the payment data is valid. The processing unit being operative to reinstate the service may comprise the processing unit being operative to reinstate the service comprising, for example, an analog cable television service, digital cable television service, pay-per-view service, internet service, video-on-demand service, or broadcast video service.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a soft disconnection, the method comprising:
    determining that a payment has not been received for a service after a date for which an account holder responsible for the service has been sent a disconnection notice;
    disconnecting, in response to determining that the payment has not been received, a portion of the service wherein disconnecting the portion the service comprises remotely disabling at least one of the following: digital cable television and internet access, wherein the service comprises both digital cable television and internet access;
    providing, in response to determining that the payment has not been received, a first user interface to a device for receiving the disconnected portion of the service, the device for receiving the disconnected portion of the service comprising one of the following: a video on demand server, a set top box, a service processor, a broadcast server, and a cable modem;
    receiving identification data in response to the provided first user interface, wherein receiving the identification data in response to the provided first user interface comprises receiving the identification data from the device for receiving the disconnected portion of the service;
    determining that the identification data is valid;
    providing, in response to determining that the identification data is valid, a second user interface to the device for receiving the disconnected portion of the service;
    receiving payment data in response to the provided second user interface, wherein receiving the payment data in response to the provided second user interface comprises receiving the payment data from the device for receiving the disconnected portion of the service;
    determining that the payment data is valid; and reinstating the disconnected portion of the service to the device in response to determining that the payment data is valid.

2. The method of claim 1, wherein providing the first user interface comprises providing the first user interface in response to receiving the user initiated request for the service.

3. The method of claim 1, wherein providing the first user interface comprises providing the first user interface being configured to inform a viewer of the first user interface that an account holder needs to log in for an important message.

4. The method of claim 1, wherein receiving the identification data comprises receiving the identification data comprising one of the following: last four digits of the account holder's social security number and a personal identification number for the account holder.

5. The method of claim 1, wherein providing the second user interface comprises providing the second user interface configured to:
  inform a viewer of the second user interface that the disconnected portion of the service has been disconnected for not paying a bill; and
  invite the viewer of the second user interface to pay the bill via the device displaying the second user interface.

6. The method of claim 1, wherein receiving the payment data comprises receiving the payment data comprising at least one of the following: credit card information, debit card information, and checking account information.

7. A computer-readable medium which stores a set of instructions which when executed performs a method for providing a soft disconnection, the method comprising:
  determining that a payment has not been received for a service after a date for which an account holder responsible for the service has been sent a disconnection notice;
  disconnecting, in response to determining that the payment has not been received, a portion of the service wherein disconnecting the portion the service comprises remotely disabling at least one of the following: digital cable television and internet access, wherein the service comprises both digital cable television and internet access;
  providing, in response to determining that the payment has not been received, a first user interface screen to a device for receiving the disconnected portion of the service, the device for receiving the disconnected portion of the service comprising one of the following: a video on demand server, a set top box, a service processor, a broadcast server, and a cable modem;
  receiving identification data in response to the provided first user interface screen, wherein receiving the identification data in response to the provided first user interface screen comprises receiving the identification data from the device for receiving the disconnected portion of the service;
  determining that the identification data is valid;
  providing, in response to determining that the identification data is valid, a second user interface screen to the device for receiving the disconnected portion of the service;
  receiving payment data in response to the provided second user interface screen, wherein receiving the payment data in response to the provided second user interface screen comprises receiving the payment data from the device for receiving the disconnected portion of the service;
  determining that the payment data is valid; and
  reinstating the disconnected portion of the service to the device in response to determining that the payment data is valid.

8. The computer-readable medium of claim 7, wherein providing the first user interface screen comprises providing the first user interface screen in response to receiving the user initiated request for a service.

9. The computer-readable medium of claim 7, wherein providing the first user interface screen comprises providing the first user interface screen being configured to inform a viewer of the first user interface screen that an account holder needs to log in for an important message.

10. The computer-readable medium of claim 7, wherein receiving the identification data comprises receiving the identification data comprising one of the following: last four digits of the account holder's social security number and a personal identification number for the account holder.

11. The computer-readable medium of claim 7, wherein providing the second user interface screen comprises providing the second user interface screen configured to:
  inform a viewer of the second user interface screen that the disconnected portion of the service has been disconnected for not paying a bill; and
  invite the viewer of the second user interface screen to pay the bill via the device displaying the second user interface screen.

12. The computer-readable medium of claim 7, wherein receiving the payment data comprises receiving the payment data comprising at least one of the following: credit card information, debit card information, and checking account information.

13. A system for providing a soft disconnection, the system comprising:
  a memory storage; and
  a processing unit coupled to the memory storage, wherein the processing unit is operative to:
    determine that a payment has not been received for a service after a date for which an account holder responsible for the service has been sent a disconnection notice;
    disconnect, in response to determining that the payment has not been received, a portion of the service by remotely disabling at least one of the following: digital cable television and internet access, wherein the service comprises both digital cable television and internet access;
    provide a first user interface screen to a device for receiving the disconnected portion of the service, the device for receiving the disconnected portion of the service comprising one of the following: a video on demand server, a set top box, a service processor, a broadcast server, and a cable modem, wherein the processing unit being operative to provide the first user interface screen comprises the processing unit being operative to provide the first user interface screen in response to:
      a determination that the payment has not been received for the service after the date for which the account holder responsible for the service has been sent the disconnection notice, and
      a receipt of an account holder initiated request for the service;
    receive identification data in response to the provided first user interface screen from the device for receiving the disconnected portion of the service in the same medium as the provided first user interface screen;
    determine that the identification data is valid;

provide, in response to a determination that the identification data is valid, a second user interface screen to the device for receiving the disconnected portion of the service;
receive payment data in response to the provided second user interface screen from the device for receiving the disconnected portion of the service in the same medium as the provided second user interface screen;
determine that the payment data is valid; and
reinstate the disconnected portion of the service to the device in response to determining that the payment data is valid.

14. The method of claim 1, further comprising initiating a disconnection phase after not having received the payment for the service within a period of time, wherein the disconnection phase comprises physically disconnecting the service at the account holder's location.

15. The computer-readable medium of claim 7, further comprising initiating a disconnection phase after not having received the payment for the service within a period of time, wherein the disconnection phase comprises physically disconnecting the service at the account holder's location.

* * * * *

UNITED STATES PATENT AND TRADEMARK OFFICE
CERTIFICATE OF CORRECTION

PATENT NO. : 8,271,383 B2
APPLICATION NO. : 11/728641
DATED : September 18, 2012
INVENTOR(S) : John Kelly King It is certified that error appears in the above-identified patent and that said Letters Patent is hereby corrected as shown below:

On the title page item (56), under OTHER PUBLICATIONS, line 1, "Moible" should read --Mobile--.

IN THE CLAIMS:

Column 8, line 41, claim 1, "portion the service" should read --portion of the service--; and Column 9, line 37, claim 7, "portion the service" should read --portion of the service--.

Signed and Sealed this
Second Day of June, 2015

Michelle K. Lee
*Director of the United States Patent and Trademark Office*